United States Patent [19]

Kunnen et al.

[11] 4,214,022

[45] Jul. 22, 1980

[54] COATING METAL BY IMMERSION

[75] Inventors: Jan Kunnen, Noordwijkerhout; Abraham C. Van Der Schee, Oegstgeest, both of Netherlands

[73] Assignee: Akzo N.V., Arnhem, Netherlands

[21] Appl. No.: 846,459

[22] Filed: Oct. 28, 1977

Related U.S. Application Data

[63] Continuation of Ser. No. 689,959, May 25, 1976, abandoned.

[30] Foreign Application Priority Data

May 30, 1975 [NL] Netherlands ............... 7506413

[51] Int. Cl.² ............................................. B05D 1/18
[52] U.S. Cl. .................................... 427/435; 427/309; 260/29.6 TA; 260/29.6 N; 260/29.6 H
[58] Field of Search .................. 427/435, 309, 437; 260/29.6 TA, 29.6 N, 29.6 H

[56] References Cited

U.S. PATENT DOCUMENTS

| | | | |
|---|---|---|---|
| 3,585,684 | 6/1971 | Steinbrecher | 427/435 |
| 3,647,567 | 3/1972 | Schweri | 427/435 |
| 3,709,743 | 1/1973 | Dalton | 427/435 |
| 3,839,097 | 10/1974 | Hall et al. | 427/435 |
| 4,108,817 | 8/1978 | Lochel, Jr. | 148/6.2 |
| 4,160,756 | 7/1979 | Nishida et al. | 427/435 |

FOREIGN PATENT DOCUMENTS 7208132  6/1972  Netherlands .

OTHER PUBLICATIONS

Mazia, "Tech. Developments in 1978", Metal Finishing Magazine, Feb. 1979.
Kirk–Othmer Encyclopedia of Chemical Technology, 2nd Ed., Wiley & Sons, Inc., N.Y., pp. 554–555.

*Primary Examiner*—Michael F. Esposito
*Assistant Examiner*—Richard Bueker
*Attorney, Agent, or Firm*—Stevens, Davis, Miller & Mosher

[57] ABSTRACT

A coating of a film-forming material is applied without electricity to a metal by immersing the metal in an aqueous dispersion which contains a film-forming material cationically dispersed in a cationic dispersion which contains a carboxylic acid radical capable of reacting with metal ions obtained by etching the metal to form a negatively charged complex in the dispersion.

9 Claims, No Drawings

COATING METAL BY IMMERSION

This is a continuation of application Ser. No. 689,959 filed May 25, 1976, now abandoned.

This invention relates to a process of applying a coating of film-forming material to an acid-etchable metal and more particularly to such a process wherein the metal surface is contacted with an aqueous dispersion of a film-forming material which contains a metal-etching acid and the coating is then dried.

A process of the type indicated above is known from, for instance, British Patent Specification No. 1,099,461. In the disclosed process, use is made of an acidic dispersion of a film-forming polymer which attacks the metal and generates metal ions which render the polymer dispersion unstable and cause coagulation of the film-forming polymer on the metal surface. The destabilization envisaged, of course, presupposes the use of an essentially anionic polymer dispersion because the negatively charged polymer particles can be coagulated then by the positive metal ions formed in situ.

In British Patent Specification No. 1,241,991 it is proposed that a depolarizing oxidant be added to an anionic polymer dispersion in order to obtain a coating with improved properties.

According to Belgian Pat. No. 792,737 the coagulating metal ion which gradually accumulates in the bath can be removed from an anionic and/or non-ionic polymer dispersion with the aid of a cation exchanger. It is true that upon coagulation of the polymer dispersion an uneven surface is obtained. But this may be counteracted by adding a small amount of a cationic or amphoteric emulsifying agent to the anionic and/or non-ionic polymer dispersion. In this patent specification it is also stated that the coating thickness of the film-forming polymer decreases with an increasing amount of such a positively charged emulsifying agent and not more than 0.5 g/l of the cationic or amphoteric emulsifying agent is added to the polymer dispersion.

A further disadvantage of the known processes is that the coating has a low moisture resistance. Moreover, the acid and surface active compounds attack the metal substrate fairly strongly, as a result of which the polymer dispersion bath will be contaminated rather rapidly.

The present invention has for its object to provide a coating composition by which the above-mentioned disadvantages are effectively obviated. It is to be noted that in the process according to the invention the coating of film-forming material is applied to the metal surface without the use of the electrical equipment required in an electrodeposition process.

The foregoing objects and others are accomplished in accordance with the invention, generally speaking, by providing a process wherein the metal to be coated is wet with an aqueous dispersion in which a film-forming material is cationically dispersed in a cationic dispersion which contains a carboxylic acid radical which along with the metal ions obtained by etching the metal surface is capable of forming a negatively charged complex in the dispersion.

That it is the cationic dispersions which yield excellent results in very surprising in that it is known of cationic emulsifying agents that they strongly reduce the acid-etchability of metals. One would therefore expect that the metal is insufficiently attacked and too few ions are generated, which would result in the polymer dispersion being rendered insufficiently unstable and no coating being formed. Besides, it would also be realized that the positive metal ions formed in situ would not destabilize the positive polymer particles.

By the process provided by the invention all kinds of metals or metal alloys can be provided with a coating of the film-forming material. Suitable substrates are steel, iron and zinc, which may or may not be galvanized or phosphated or may be provided or not with a chromate, an oxalate or an oxide layer. Other suitable metals are, for instance, copper, lead, cadmium and magnesium and alloys such as brass. It is preferred that as metal substrate, steel should be used.

Although in the process of the invention the film-forming material to be applied to a metal substrate may be chosen from widely different dispersions such as those of waxes, oils and fats, it is preferred that use should be made of a resin dispersion or a polymer dispersion. As examples of suitable cationic polymer dispersions may be mentioned dispersions obtained by emulsion polymerization of monomers such as the vinyl esters of fatty acids with 1–18 carbon atoms, such as vinyl acetate, vinyl propionate, vinyl butyrate, vinyl laurate and vinyl stearate; ethylenically unsaturated acids such as acrylic acid, methacrylic acid, crotonic acid, itaconic acid and fumaric acid or mesaconic acid, citraconic acid, maleic anhydride, or esters of such acids with alcohols, glycols or epoxides with 1–18 carbon atoms, such as methyl acrylate, methyl methacrylate, ethyl acrylate, glycidyl methacrylate, isopropyl acrylate, the various butyl acrylates or butyl methacrylates, cyclohexyl methacrylate, isobornyl acrylate and 2-ethylhexyl acrylate or mixtures of the above-mentioned compounds. Other suitable monomers are for instance: acrylonitrile, methacrylonitrile, acrylamide, methacrylamide, styrene, 1,3-butadiene, vinyl toluene, divinyl benzene, tert-butyl aminoethyl methacrylate, hydroxyalkyl acrylates or methacrylates and compounds such as 2-hydroxypropyl methacrylate-trimethyl-ammonium chloride and ethyl methacrylate-trimethyl-ammonium methyl sulphate. Dispersions formed by dispersing a previously prepared film-forming polymer in water with a cationic emulsifying agent may also be used. In general, the polymer dispersion may have a solids content in the range of 10 to 70%, and preferably in the range of 20 to 50% by weight.

To obtain a cationic dispersion any cationic or amphoteric surface active compound may be used. As examples of suitable cationic compounds may be mentioned primary alkyl monoamines, such as tall fatty acid amine; tertiary alkyl monoamines such as dimethyl stearyl amine; N-alkyl diamines such as tall fatty acid propylene diamine; N-alkyl triamines such as tall fatty acid dipropylene triamine, N-alkyl polyamines such as tall fatty acid polypropylene polyamine; ethoxylated primary alkyl monoamines, such as ethoxylated tall fatty acid amine or ethoxylated stearyl monoamine; ethoxylated alkyl diamines such as ethoxylated tall fatty acid propylene diamine; ethoxylated alkyl amides such as ethoxylated N-alkyl amide; quaternary ammonium salts such as trimethyl stearyl ammonium chloride, dimethyl dicoco ammonium chloride and stearyl amido propyl-dimethyl-$\beta$-hydroxyethyl ammonium dihydrogen phosphate and compounds such as alkylimidazoline and tall fatty acid amino acetate; as examples of suitable amphoteric surface active compounds may be mentioned tall fatty acid propylene diaminopropionic acid and N-coco-$\beta$-amino butyric acid. An amphoteric emulsifying agent may, of course, be used as such because in the acidic polymer dispersion it behaves as a cationic emulsifying agent.

Also mixtures of surface active compounds may be used. The emulsifying system is usually employed in an amount of 0.1 to 15% by weight, and preferably in an amount of 0.2 to 4% by weight, based on the film-forming polymer. In the case of a self-emulsifying polymer, however, there is no need to add an emulsifying agent.

The carboxylic acid radical to be present in the cationic dispersion according to the invention may be derived from any suitable carboxylic acid such as, for instance: glycolic acid, oxalic acid, mandelic acid, propanoic acid, ethoxyacetic acid, maleic acid, itaconic acid, malic acid, tatronic acid, glutaric acid, cyclobutanedicarboxylic acid, tricarballylic acid, citric acid, succinic acid and/or malonic acid. The acid radical may be added to or present in the polymer dispersion as a salt, for instance, as alkali metal salt and/or in the form of acid. Usually, the carboxylic acid radical is an acid and is added in such an amount that the pH of the dispersion has a value below about 6, and preferably in the range of ½ to 4. Other acid radicals such as those derived from mineral acids or from acids such as acetic acid, monochloroacetic acid and trichloroacetic acid may, if desired, additionally be present in or added to the dispersion in small amounts, provided that they do not predominantly interfere in the formation of the negative complex of the carboxylic acid radical to be present in the dispersion according to the invention along with the metal ion obtained by etching the metal surface. Alternatively, acid radicals as those derived from acrylic acid and/or methacrylic acid may be employed.

Whether a carboxylic acid radical meets the requirement made by the invention as regards the formation of a negative complex with a specific metal ion can be established in a simple manner by means of a paper electrophoresis test. This test can be carried out using a voltage of 8–12 V and a current of about 20 m A at room temperature for about 2 hours. The buffer solution employed with this method contains per liter 0.2 moles of the sodium salt of the acid radical to be used and is brought to a pH-value between 1 and 4 by addition of the respective acid.

Onto the electrophoresis paper is brought 1 microliter of a 2–5% by weight solution of the respective metal salt of the acid radical to be applied. When as metal ions ferric ions are used, ammonium rhodanide can be employed as identification agent. If the metal complex has run in the direction of the positive electrode, then the solution contains negatively charged metal complexes and the acid radical used meets the requirement to be made according to the invention. The metal surface may be contacted with the acidic aqueous dispersion of the film-forming polymer in any suitable manner, for instance, by rolling, spraying, brushing, sprinkling or pouring. As a rule, the contacting will be effected by dipping.

The time the metal surface is in contact with the acidic polymer dispersion may vary between wide limits, for instance, between 2 seconds and 15 minutes. Between wide limits the temperature of the polymer dispersion is of little influence on the thickness of the polymer coating. In general, the temperature may be between the freezing point and the boiling point of the dispersion, for instance between 1° and 95° C., and preferably between 5° and 40° C.

The aqueous dispersion of the film-forming polymer may contain usual and suitable additives, for instance: pigments; fillers; anti-foaming agents; dispersing agents; thickeners; corrosion inhibitors; softeners; co-solvents; coalescing agents; siccatives such as metal naphthenates; and waxes. Moreover, the aqueous polymer dispersion may contain organic solvents, for instance, toluene or xylene. The polymer dispersion also may contain other polymeric compounds, for instance, water-soluble resins or polymers, amino resins, such as urea formaldehyde resins and melamine-formaldehyde resins; phenol-formaldehyde resins, polyvinyl pyrrolidone and polyvinyl methyl ether.

After the coating has been applied to the metal surface, it is dried in the usual manner and very often it is baked, for instance, at temperatures between 70° and 300° C., for 2 to 60 minutes.

EXAMPLE 1

Into a reactor provided with a stirrer, a thermometer, a nitrogen inlet, a reflux condenser and a funnel were charged 700 grams of demineralized water, 6 grams of ethoxylated primary monoamine with 2 ethylene oxide groups (available under the trade name "Ethomeen T12") derived from tall oil fatty acid, about 1 gram of monochloroacetic acid to neutralize the surface active compound, 3.4 grams of a 30% by weight-aqueous solution of hydrogen peroxide and 0.6 grams of a 1% by weight-aqueous solution of cupric nitrate. Of 300 grams of a monomer mixture, which consisted of 135 grams of styrene and 165 grams of butyl acrylate, there were first added 90 grams.

Subsequently, the air present in the reactor was replaced with nitrogen and the contents of the reactor were emulsified by stirring. Next, the reaction mixture was heated to 90° C. and the remaining 210 grams of the monomer mixture were added to the reactor over a period of 2 hours, after which the temperature was maintained at 90° C. for two hours. The resulting dispersion had a solids content of 28.2% and a pH-value of 4.0.

A steel test panel cleaned in the usual way was immersed for 1 minute in the dispersion obtained as described above, after which 2% by weight (based on the dispersion) of a 10% by weight aqueous solution of malic acid was added. After the test panel had been rinsed in demineralized water and following baking for 20 minutes at 180° C., it was found to be covered with a properly adherent coating having a thickness of 40 $\mu$m.

For comparison the above process was repeated, except that a 10% by weight-aqueous solution of monochloroacetic acid was used instead of the 10% by weight-aqueous solution of malic acid. After the panel had been rinsed in demineralized water, no trace of an adhering polymer coating was found on it.

EXAMPLE 2

Example 1 was repeated, except that as cationic surface active compound N-tall fatty acid propylene diamine (available under the trade name "Duomeen T") was added. The resulting dispersion had a solids content of 29.2% and a pH-value of 3.8. To the dispersion there was still added 2% by weight (based on the dispersion) of a 5% by weight-aqueous solution of mandelic acid before the steel test panel was immersed in it. The properly adherent polymer coating obtained had a thickness of 40 $\mu$m.

EXAMPLE 3

Example 1 was repeated, except that as surface active compound 12 grams of a 50% by weight-solution of a quaternary dialkyl ammonium chloride in isopropanol (available under the trade name "Arquad 2C-50") were used and that as carboxylic acid tricarballylic acid was employed. The resulting dispersion had a solids content of 28.8% and a pH-value of 2.5. To this dispersion there was not added an additional amount of carboxylic acid. The properly adherent polymer coating has a thickness of 25 μm.

EXAMPLE 4

Example 1 was repeated, except that a monomer mixture composed of 135 grams of styrene and 165 grams of butyl acrylate were employed and that tricarballylic acid was used instead of monochloroacetic acid. The resulting dispersion had a solids content of 26.0% and a pH-value of 3.5. To this dispersion there was still added 2% by weight (based in the dispersion) of a 10% by weight-aqueous solution of tricarballylic acid. Applied to the steel test panel, the dispersion thus obtained resulted in a properly adherent polymer coating having a thickness of 50 μm.

EXAMPLE 5

Example 1 was repeated, except that as surface active compound 10.9 grams of a 55% by weight-aqueous solution of N-coco-β-aminobutyric acid (available under the trade name "Armeen Z") were used. The resulting dispersion had a solids content of 28.8% and pH-value of 3.0. To this dispersion there was still added 2% by weight (based on the dispersion) of a 10% by weight-aqueous solution of malic acid. The properly adherent polymer coating thus obtained on the steel test panel had a thickness of 45 μm.

EXAMPLE 6

Into a reactor, provided with a stirrer, a reflux condenser and a funnel there were charged 10 grams of polyurethane resin of the formula

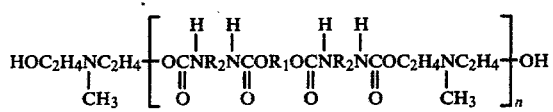

wherein $R_1$ represents the group formed by abstraction of the terminal hydroxyl groups from a hydroxypolyester with an $M_n=750$ and composed of 1,6-hexane diol and adipic acid, $R_2$ represents a 2,4-toluylene group and a 2,6-toluylene group in a ratio of 80:20, and where n is a number between about 10 and about 20. The polyurethane resin was dissolved in 50 milliliters of tetrahydrofuran and subsequently neutralized with citric acid. Next, the resin solution was slowly dispersed in 90 grams of demineralized water under reflux followed by distilling off the tetrahydrofuran. The resulting dispersion had a solids content of 10%. To this dispersion was still added 2% by weight (based on the dispersion) of a 10% by weight-aqueous solution of citric acid. Applied to a steel test panel pre-treated with a zinc phosphate, the dispersion thus obtained resulted in a properly adherent polymer coating having a thickness of 10 μm.

EXAMPLE 7

Example 1 was repeated, except that use was made of a monomer mixture composed of 114 grams of styrene, 142 grams of butyl acrylate and 110 grams of a 40% by weight-aqueous solution of ethyl methacrylate-trimethyl ammonium methyl sulphate (available under the trade name "Quolac Mer Q5"). Quolac Mer Q5 being a monomer which renders the copolymer self-dispersing, the ethoxylated monoamine and the monochloroacetic acid were left out of the recipe used in this example. The resulting dispersion had a solids content of 26.8% and a pH-value of 3.4. To this dispersion was added 4% by weight (based on the dispersion) of a 10% by weight-aqueous solution of citric acid. The dispersion thus obtained was applied to a steel test panel and a properly adherent polymer coating having a thickness of 10 μm was found to have formed.

EXAMPLE 8

This example serves to show the influence of acids such as monochloroacetic acid and hydrochloric acid that are essentially unsuitable to be used for the process according to the invention. To this end, Example 1 was repeated, except that the dispersion with a pH-value of 4.0 was acidified with a mixture of mandelic acid and one of the unsuitable acids instead of malic acid, so that the dispersions obtained had a pH-value of 2.2 and a solids content of about 23%. In the following table are listed the concentrations of mandelic acid, monochloroacetic acid and hydrochloric acid in the resulting dispersion (expressed in millimoles per liter). The table also gives the various coating thicknesses (expressed in μm) on the test panels.

Table 1

| Experiment | Nature and amount of acid in mmoles/liter | | Thickness polymer coating in μm |
|---|---|---|---|
| | Mandelic acid | Essentially unsuitable acid monochloroacetic acid | |
| a | 30 | 0 | 55 |
| b | 17 | 5 | 40 |
| c | 13 | 7 | 25 |
| d | 9.5 | 8.5 | 15 |
| e | 7.5 | 9.5 | 10 |
| f | 4.5 | 10.5 | 0 |
| | | hydrochloric acid | |
| g | 30 | 0 | 55 |
| h | 17 | 2.9 | 40 |
| i | 13 | 3.9 | 25 |
| j | 9.5 | 4.4 | 15 |
| k | 7.5 | 4.9 | 7.5 |
| l | 4.5 | 5.9 | 0 |

Although the invention had been described in detail for the purpose of illustration, it is to be understood that such detail is solely for that purpose and that variations can be made therein by those skilled in the art without departing from the spirit and scope of the invention except as it may be limited by the claims.

We claim:

1. In an autodeposition process of applying a coating of film-forming material to an acid-etchable metal wherein the metal surface is contacted with an aqueous dispersion of the film-forming material which contains a metal-etching acid, followed by drying the coating, the improvement which comprises dispersing the film-forming material in a cationic dispersion containing at least 0.1% cationic surfactant and a carboxylic acid radical which along with the metal ions obtained by etching the metal surface is capable of forming a negatively charged complex in the dispersion.

2. The process of claim 1 wherein the metal substrate is steel.

3. The process of claim 1 wherein the cationic dispersion contains a cationic or amphoteric surface active compound.

4. The process of claim 3 wherein the cationic polymer dispersion contains 0.1–15% by weight of surface active compound, based on the film-forming polymer.

5. The process of claim 1 wherein the pH of the cationic dispersion has a value below about 6.

6. The process of claim 1 wherein the acidic polymer dispersion contains a carboxylic acid radical derived from mandelic acid.

7. The process of claim 1 wherein the acidic polymer dispersion contains a carboxylic acid radical derived from malic acid.

8. The process of claim 1 wherein the acidic polymer dispersion contains a carboxylic acid radical derived from citric acid.

9. An autodeposition process for coating an acid-etchable metal with a polymer which comprises covering the metal with a cationic dispersion of a polymer in water containing a metal-etching acid and a carboxylic acid radical which forms a negatively charged complex with metal ions in the dispersion resulting from etching of the metal with said metal-etching acid.

* * * * *